R. S. MATHESON.
LAMP ATTACHMENT FOR AUTOMOBILES.
APPLICATION FILED OCT. 2, 1911.
1,065,700.
Patented June 24, 1913.
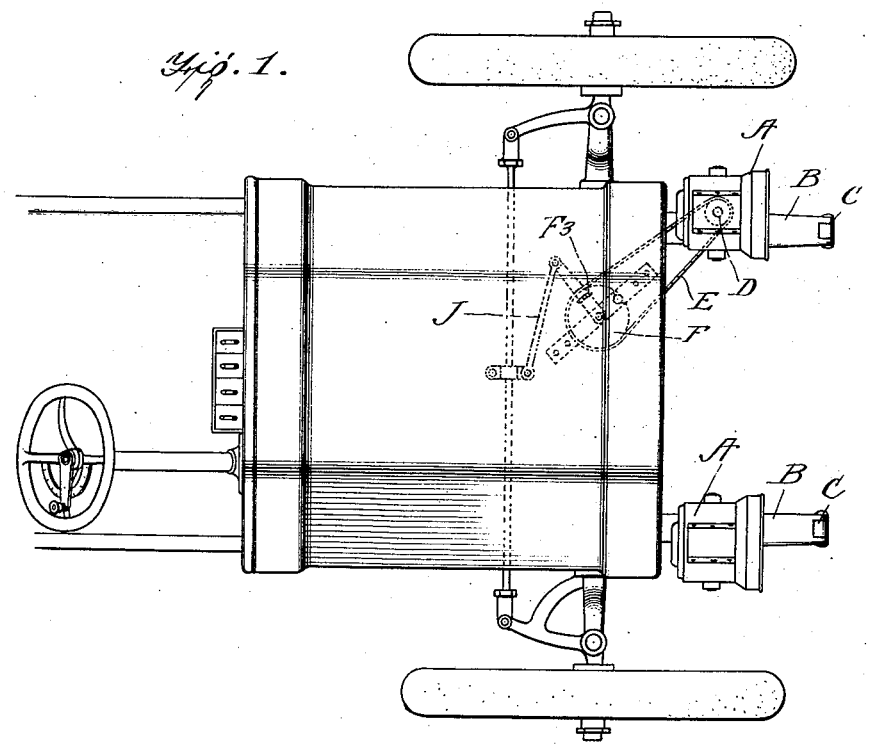
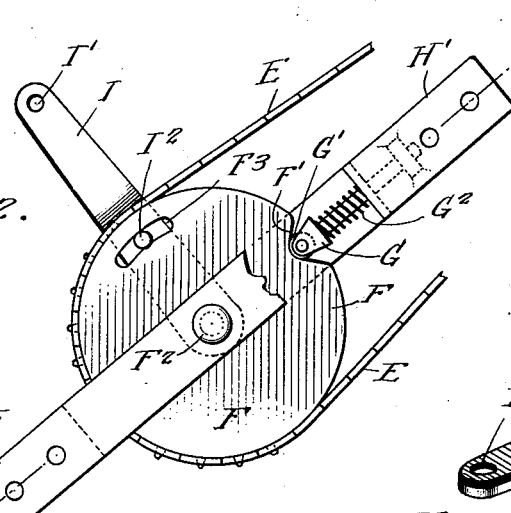
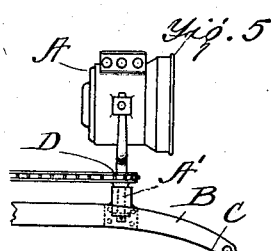
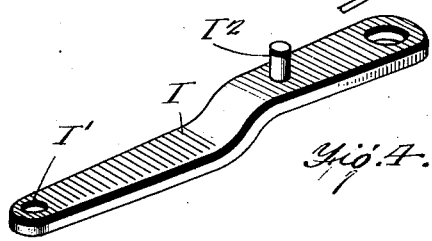
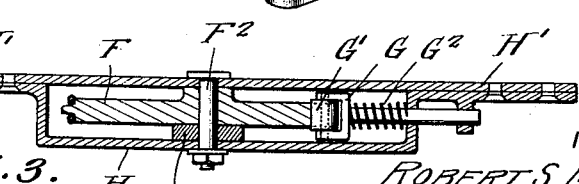
INVENTOR
ROBERT S. MATHESON,
BY
ATTORNEYS

UNITED STATES PATENT OFFICE.

ROBERT S. MATHESON, OF LINGAYEN, PHILIPPINE ISLANDS.

LAMP ATTACHMENT FOR AUTOMOBILES.

1,065,700.     Specification of Letters Patent.     Patented June 24, 1913.

Application filed October 2, 1911. Serial No. 652,297.

*To all whom it may concern:*

Be it known that I, ROBERT S. MATHESON, a citizen of the United States, and a resident of Lingayen, Island of Luzon, Philippine Islands, have invented certain new and useful Improvements in Lamp Attachments for Automobiles, of which the following is a specification.

This invention is an improvement in lamp attachments for automobiles and particularly in lamps designed to turn automatically and light up the road while rounding curves; and the invention consists in certain novel constructions and combinations of parts as will be hereinafter described and claimed.

In the drawing Figure 1 is a top plan view of a portion of an automobile provided with my improvements. Fig. 2 is a detail plan view, partly broken away, of the master wheel and the parts immediately associated therewith. Fig. 3 is a vertical longitudinal section drawn through the bracket and the master wheel carried thereby. Fig. 4 is a detail view of the rocking arm for operating the master wheel. Fig. 5 is a detail side view of a lamp in place on the frame of a machine.

In practice, the lamps A which may be of any suitable type, are mounted on the frame B above the spring C, see Figs. 1 and 5, in such manner as to prevent the road shocks from influencing the lamps. As shown, one of these lamps is pivoted vertically at A', see Fig. 5, so it may be turned on its vertical axis and is provided with a sprocket wheel D receiving a sprocket chain E which connects the pinion D with the master wheel F so the turning of the latter will effect a corresponding movement of the lamp, the pinion D being much smaller than the wheel F so that the multiplying gear will give the desired radius of action to the lamp. The other lamp may be similarly connected to the steering mechanism.

The sprocket wheel F meshes with the chain E and is provided with a rounded notch F' entered by a roller G' of the detent G, the roller G' being spring pressed by the spring $G^2$ into the notch F' in such manner as to hold the wheel F normally in position as against accidental movement and at the same time permit the convenient turning of the wheel F when force is applied thereto by the action of the steering gear as more fully described hereinafter.

The wheel F is journaled at $F^2$ in the bracket H, suitably secured at H' to the car and the rocking arm I is pivoted concentrically with the wheel F and is connected at its swinging end I' by a link J with the steering gear of the car, see Fig. 1, so that the movement of the steering gear will rock the arm or lever I in such manner as to cause it to rock the master wheel F when the machine is rounding curves. The lever I is capable of a limited rocking movement independently of the master wheel, so that the steering gear can be moved slightly as in ordinary steering on straight roads without wavering the lamps from a straight ahead position. To this end, a pin $I^2$ on the lever I operates in a slot $F^3$ in the wheel F so the lever I has a slight play from its normal position as shown in Fig. 2, in both directions without moving the wheel F.

I have shown the improvement applied to only one lamp in Fig. 1, but manifestly it may be applied to both lamps, if desired.

The detent G as before described, is a yielding detent operating to hold the wheel F yieldingly in normal position without preventing the forcible movement of the said wheel in either direction according to the motion given to the steering gear.

In operation, it will be noticed that if the steering gear is operated to turn the machine in one direction or the other, the lamp will be correspondingly turned to throw the light in the direction of the curve.

I claim:

1. A lamp attachment, comprising in combination, a pivotally supported lamp provided with a pinion, a master wheel relatively larger than the pinion and provided with a rounded notch, a yielding spring actuated detent operating in said notch to hold the master wheel yieldingly in normal position, a sprocket chain connecting the master wheel with the pinion, a rocking lever swinging concentrically with the master wheel and provided with a pin, the master wheel having a slot receiving said pin, steering gear and connections between the rocking lever and the steering gear.

2. An apparatus, comprising a vertically pivoted lamp provided with a pinion, a master wheel geared with said pinion and provided with a rounded notch and with a slot, a spring actuated yielding detent operating in said notch and a lever adapted for connection with a steering gear and rocking concentrically with the master wheel and provided with a pin entering the slot of the master wheel.

3. The combination of a vertically pivoted lamp, a master wheel geared with the lamp and provided with a slot, and a rocking lever for operating said master gear, said lever being adapted for connection with a steering gear and being provided with a pin entering the slot of the master wheel, substantially as set forth.

4. In a lamp attachment for automobiles, the combination of a lamp and a master wheel for operating the lamp, a yielding detent for holding the master wheel yieldingly in normal position and an arm for operating said master wheel and capable of a limited movement independent of the said wheel, substantially as set forth.

ROBERT S. MATHESON.

Witnesses:
JOSEPH LESLIE BARR,
EDGAR CARL SMITHERS.